(12) United States Patent
Hatanaka et al.

(10) Patent No.: US 10,453,611 B2
(45) Date of Patent: Oct. 22, 2019

(54) CAPACITOR MANUFACTURING METHOD

(71) Applicant: MEIDENSHA CORPORATION, Tokyo (JP)

(72) Inventors: Michihiro Hatanaka, San Jose, CA (US); Daizo Takahashi, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 16/329,845

(22) PCT Filed: Aug. 16, 2017

(86) PCT No.: PCT/JP2017/029420
§ 371 (c)(1),
(2) Date: Mar. 1, 2019

(87) PCT Pub. No.: WO2018/043126
PCT Pub. Date: Mar. 8, 2018

(65) Prior Publication Data
US 2019/0244759 A1    Aug. 8, 2019

(30) Foreign Application Priority Data

Sep. 2, 2016   (JP) .................................. 2016-171406

(51) Int. Cl.
*H01G 9/00* (2006.01)
*H01G 4/232* (2006.01)
(Continued)

(52) U.S. Cl.
CPC ............ *H01G 4/232* (2013.01); *B23K 1/0016* (2013.01); *H01G 4/02* (2013.01); *H01G 13/00* (2013.01)

(58) Field of Classification Search
CPC .......... H01G 9/00; H01G 11/00; H01G 4/232; H01G 4/02; H01G 13/00
See application file for complete search history.

(56) References Cited

U.S. PATENT DOCUMENTS

| 6,307,729 | B1 | 10/2001 | Fukai et al. |
| 2006/0011713 | A1 | 1/2006 | Leibisch |
| 2016/0005540 | A1 | 1/2016 | Tanner et al. |

FOREIGN PATENT DOCUMENTS

| JP | 3-11607 A | 1/1991 |
| JP | 2000-58384 A | 2/2000 |

(Continued)

*Primary Examiner* — Seahvosh Nikmanesh
(74) *Attorney, Agent, or Firm* — Foley & Lardner LLP

(57) ABSTRACT

Disclosed is a method for manufacturing a vacuum capacitor (1) provided with an insulating pipe (2), terminal electrodes (3, 4) that are disposed at open ends of the insulating pipe (2), and spiral electrodes (5, 6) that are connected to the terminal electrodes (3, 4). An electrode plate (7) and a spacer (8) are wound on a core member (9) to prepare a spiral electrode (5), and an electrode plate (10) and a spacer (8) are wound on a core member (11) to prepare a spiral electrode (6). A linear brazing material (12) is disposed in a groove (3c) formed in a surface of the terminal electrode (3) on an inner side of the insulating pipe (2). A platy brazing material (13) is sandwiched between the terminal electrode (3) and the spiral electrode (5) to fix the spiral electrode (5) to the terminal electrode (3). The insulating pipe (2) and the spiral electrode (6) are placed on the terminal electrode (4), and the terminal electrode (3) is disposed on the insulating pipe (2), thereby temporarily assembling the vacuum capacitor (1). The vacuum capacitor (1) is put into a vacuum heating furnace, and the terminal electrode (3) and the spiral electrode (5), the terminal electrode (4) and the spiral electrode (6), and the insulating pipe (2) and the terminal electrodes (3, 4) are respectively brazed.

2 Claims, 3 Drawing Sheets

(51) Int. Cl.
*H01G 13/00* (2013.01)
*H01G 4/02* (2006.01)
*B23K 1/00* (2006.01)

(56) References Cited

FOREIGN PATENT DOCUMENTS

| | | |
|---|---|---|
| JP | 2007-524217 A | 8/2007 |
| JP | 2016-517175 A | 6/2016 |

CAPACITOR MANUFACTURING METHOD

TECHNICAL FIELD

The present invention relates to a method for manufacturing a capacitor. In particular, it relates to a brazing technology that is applied to vacuum instruments such as vacuum capacitor.

BACKGROUND ART

Vacuum capacitor forms capacitance by a pair of electrodes built in a vacuum container (e.g., Patent Publication 1). Vacuum capacitor is equipped with, for example, a pair of terminal electrodes that seals open ends of an insulating pipe and tubular electrode plates that stand on the respective terminal electrodes. In the tubular electrode plates, electrode plates that are different in diameter are concentrically arranged.

Normally, in the vacuum capacitor manufacturing steps, terminal electrodes are disposed on the top and the bottom of the insulating pipe, and then the insulating pipe and the terminal electrodes are brazed. Therefore, at the terminal electrode disposed on the top of the insulating pipe, the electrode plate extends downwardly. If the electrode plate is not brazed to the terminal electrode, the terminal electrode and the electrode plate are separated from each other. Thus, the electrode plate is brazed to the terminal electrode by the first brazing, and then brazing between the insulating pipe and the terminal electrode is conducted by the second brazing. In this manner, brazing of vacuum capacitor is completed by conducting brazing steps at least two times. This is not limited to vacuum capacitors, but is the same even in gas-filled-type capacitors.

However, the increase of the number of brazing steps results in the increase of the capacitor production cost.

PRIOR ART PUBLICATIONS

Patent Publications

Patent Publication 1: JP Patent Application Publication 2000-58384

SUMMARY OF THE INVENTION

The present invention was made in view of the above situation, and its object is to reduce the number of capacitor brazing steps to lower the capacitor production cost.

According to one mode of a capacitor manufacturing method of the present invention to achieve the object, there is provided a method for manufacturing a capacitor provided with an insulating pipe, first and second terminal electrodes that are disposed at open ends of the insulating pipe, a first electrode plate that stands on the first terminal electrode and extends from the first terminal electrode toward an inside of the insulating pipe, a second electrode plate that stands on the second terminal electrode and extends from the second terminal electrode toward the inside of the insulating pipe, a first core member on which the first electrode plate is wound, and a second core member on which the second electrode plate is wound, the capacitor having a groove formed in a surface of the first terminal electrode on a side of the inside of the insulating pipe, the method comprising the steps of winding a stack of the first electrode plate and a spacer on the first core member, thereby obtaining a first spiral electrode; winding a stack of the second electrode plate and a spacer on the second core member, thereby obtaining a second spiral electrode; providing a brazing material in the groove of the first terminal electrode and temporarily attaching the first spiral electrode to the first terminal electrode; placing the insulating pipe and the second spiral electrode on the second terminal electrode and disposing the first terminal electrode, to which the first spiral electrode has been temporarily attached, at an upper open end of the insulating pipe, thereby assembling the capacitor; and brazing the first terminal electrode and the first spiral electrode, brazing the second terminal electrode and the second spiral electrode, brazing the first terminal electrode and the insulating pipe, and brazing the second terminal electrode and the insulating pipe.

According to another mode of a capacitor manufacturing method of the present invention to achieve the object, in the above-mentioned capacitor manufacturing method, in the step of temporarily attaching the first spiral electrode to the first terminal electrode, a brazing material is provided between the first terminal electrode and the first spiral electrode.

According to the above-mentioned invention, the number of capacitor brazing steps is reduced, thereby lowering the capacitor production cost.

BRIEF DESCRIPTION OF THE DRAWINGS

FIGS. 4(a) to 4(e) are views showing exemplary methods for temporarily attaching the spiral electrode to the terminal electrode, wherein FIG. 4(a) is a view showing a method using a fixing ring, FIG. 4(b) is a view showing a method using a fixing ring and caulking, FIG. 4(c) is a view showing a method using press fitting, FIG. 4(d) is a view showing a method using press fitting and caulking, and FIG. 4(e) is a view showing a method of fixing by a screw (or rivet).

MODE FOR IMPLEMENTING THE INVENTION

A capacitor manufacturing method according to an embodiment of the present invention is explained in detail, based on the drawings. In the explanation of the embodiment, in the brazing step, a terminal electrode disposed on an upper side of the insulating pipe is defined as an upper side terminal electrode, and a terminal electrode disposed on a lower side of the insulating pipe is defined as a lower side terminal electrode. However, the upper and lower setup never limits the present invention.

Figure 1:
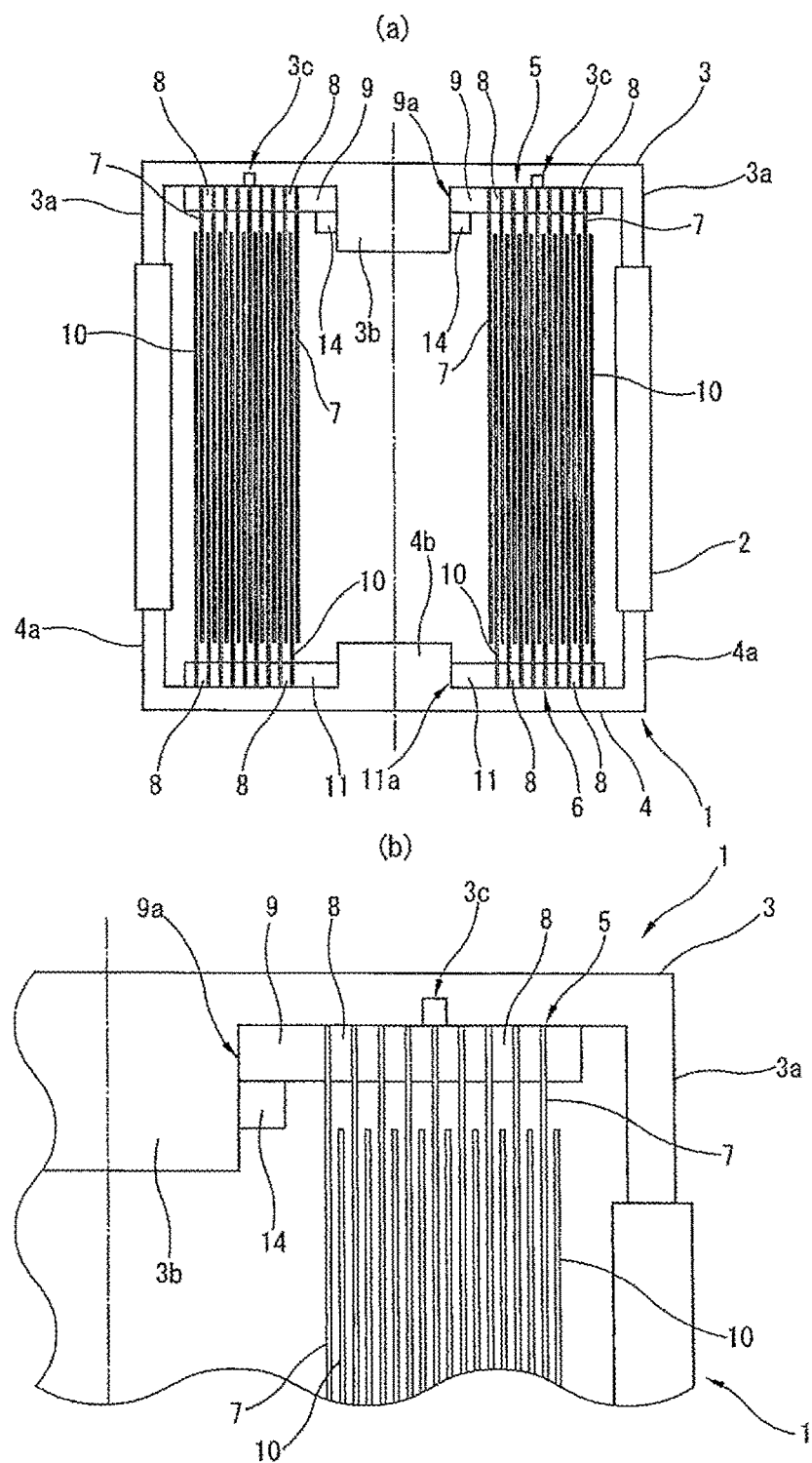
FIG. 1(a) is a cross-sectional view showing a capacitor's essential part according to an embodiment of the present invention.
FIG. 1(b) is an expanded sectional view of the capacitor.

As shown in FIG. 1, a vacuum capacitor 1 (capacitor, hereinafter the same) according to the embodiment of the present invention is equipped with an insulating pipe 2, a pair of terminal electrodes 3, 4 (first and second terminal electrodes) disposed at open ends of the insulating pipe 2, a spiral electrode 5 (first spiral electrode, hereinafter the same) to be connected to the terminal electrode 3, and a spiral electrode 6 (second spiral electrode, hereinafter the same) to be connected to the terminal electrode 4.

The terminal electrode 3 (first terminal electrode, hereinafter the same) is disposed at one end of the insulating pipe 2 to seal an open end of the insulating pipe 2. The terminal electrode 4 (second terminal electrode, hereinafter the same) is disposed at the other end of the insulating pipe 2 to seal an open end of the insulating pipe 2. In this way, the open ends of the insulating pipe 2 are sealed with the terminal electrodes 3, 4 to form a vacuum container. The terminal electrodes 3, 4 are provided with connecting sections 3a, 4a extending toward the insulating pipe 2 along the outer peripheries of the terminal electrodes 3, 4. Furthermore, the terminal electrodes 3, 4 are provided at their center sections with projection sections 3b, 4b projecting towards the inner side of the insulating pipe 2. Furthermore, the terminal electrode 3 to be disposed on the upper side when conducting brazing is formed in its surface on the inner side of the insulating pipe 2 with a groove 3c (for example, groove 3c concentric with the outer periphery of the terminal electrode 3). In the brazing step, a brazing material is provided in this groove 3c. In the explanation of the embodiment, the connection sections 3a, 4a are brazed directly to the insulating pipe 2. It is, however, also possible to make a mode in which end sections of the insulating pipe 2 are provided with sealing attachments and then the terminal electrodes 3, 4 are brazed to the sealing attachments.

The spiral electrode 5 is equipped with an electrode plate 7 (a first electrode plate, hereinafter the same) that stands toward the inner side of the insulating pipe 2 of the terminal electrode 3, a spacer 8 that determines the distance between the electrode plates 7, and a core member 9 (bridge, first core member, hereinafter the same) on which the electrode plate 7 is wound. Similarly, the spiral electrode 6 is equipped with an electrode plate 10 (a second electrode plate, hereinafter the same) that stands toward the inner side of the insulating pipe 2 of the terminal electrode 4, a spacer 8 that determines the distance between the electrode plates 10, and a core member 11 (bridge, second core member, hereinafter the same) on which the electrode plate 10 is wound.

The electrode plates 7, 10 are long strip-like thin plates. The electrode plate 7 and the spacer 8 are stacked and wound on the core member 9. That is, the electrode plate 7 to be connected to the terminal electrode 3 is spiral to be spaced by the distance corresponding to the thickness of the spacer 8 and is provided to extend from the terminal electrode 3 toward the inner side of the insulating pipe 2. Similarly, the electrode plate 10 and the spacer 8 are stacked and wound on the core member 11. That is, the electrode plate 10 to be connected to the terminal electrode 4 is spiral to be spaced by the distance corresponding to the thickness of the spacer 8 and is provided on the terminal electrode 4 to extend from the terminal electrode 4 toward the inner side of the insulating pipe 2.

The core members 9, 11 are members that determine the spiral shape of the spiral electrodes 5, 6. There is a difference that is about a half of the spacer 8 between the radius of the core member 9 and the radius of the core member 11, and the core member 9 and the core member 11 are disposed such that one of their surfaces having the electrode plate 7 (or the electrode plate 10) is opposed to the other. With this, the electrode plate 7 and the electrode plate 10 are alternately disposed. The core members 9, 11 are formed at their center sections with holes 9a, 11a passing through in the axial directions of the core members 9, 11 for making the spiral electrodes 5, 6.

[Capacitor Manufacturing Method]

Firstly, the electrode plate 7 and the spacer 8 are fixed to the starting point of the core member 9 by welding, etc., then wound on the core member 9, and their terminal section is also fixed by welding, etc. Similarly, the electrode plate 10 and the spacer 8 are fixed to the starting point of the core member 11, then wound on the core member 11, and their terminal section is also fixed by welding, etc.

Figure 2:
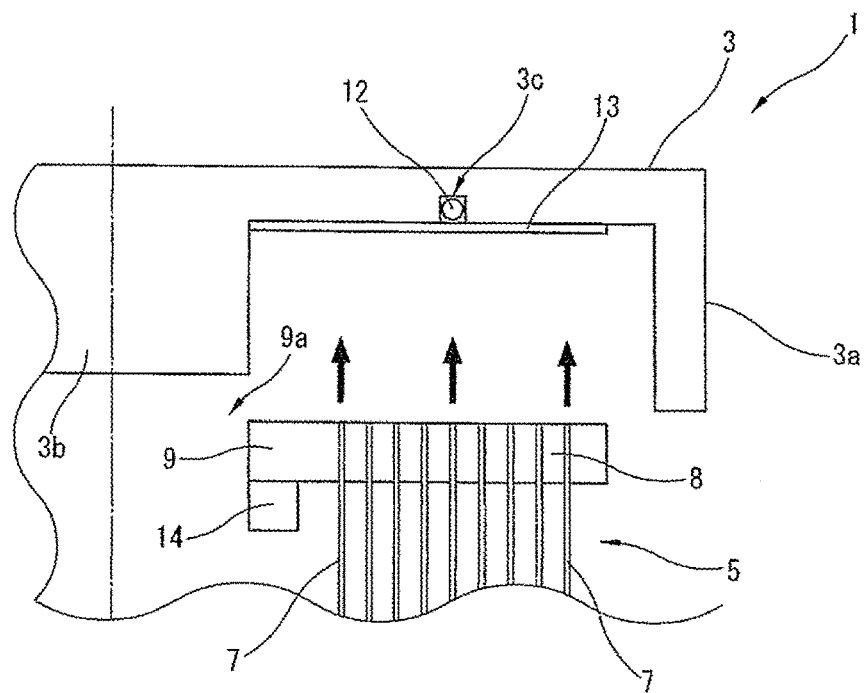
FIG. 2 is an explanatory view to explain the step of disposing the spiral electrode on the terminal electrode.

Then, the spiral electrode 5 is fixed to the terminal electrode 3 that is disposed on the upper side when conducting the brazing. At this time, as shown in FIG. 2, a linear brazing material 12 is provided in the groove 3c of the terminal electrode 3, and a platy brazing material 13 is provided between the terminal electrode 3 and the spiral electrode 5 (i.e., one in which the core member 9 and the electrode plate 7 are united with each other). The terminal electrode 3 and the spiral electrode 5 are fixed to each other, for example, by a method in which the projection section 3b of the terminal electrode 3 is inserted into the hole 9a formed through the core member 9 and then a ring member 14 is pressed in to fixed it.

Then, the spiral electrode 6 (i.e., one in which the core member 11 and the electrode plate 10 are united with each other) is placed on the terminal electrode 4 that is disposed on the lower side when conducting the brazing, with an interposal of a platy brazing material (not shown in the drawings). Furthermore, the connecting section 4a of the terminal electrode 4 and the connecting section 3a of the terminal electrode 3 are provided with brazing material, and the insulating pipe 2 is provided therebetween. Furthermore, the terminal electrode 3 is provided on the insulating pipe 2 in a manner to insert the electrode plate 7 between the electrode plates 10, thereby temporarily assembling the vacuum capacitor 1. The temporarily assembled vacuum capacitor 1 is put into a vacuum heating furnace to conduct vacuum brazing. In this brazing step, there are conducted brazing between the terminal electrode 3 and the spiral electrode 5, brazing between the terminal electrode 4 and the spiral electrode 6, and brazing between the insulating pipe 2 and the terminal electrode 3 and the terminal electrode 4.

In accordance with the capacitor manufacturing method according to the embodiment of the present invention, a one-time brazing makes it possible to conduct brazing between the upper side terminal electrode 3 and the spiral electrode 5 (i.e., electrode plate 7) and brazing between the lower side terminal electrode 4 and the spiral electrode 6 (i.e., plate electrode 10). As a result, the number of the brazing steps is reduced, and this makes it possible to lower the cost for manufacturing the vacuum capacitor 1.

Hitherto, when conducting brazing of a vacuum capacitor, the vacuum capacitor in a temporarily assembled condition is put into a vacuum heating furnace to conduct brazing. At this time, in order to prevent an electrode plate to be connected to an upper side terminal electrode from falling down, the electrode plate is previously brazed to the terminal electrode. Even if it is a concentric electrode or spiral electrode, the terminal electrode and the electrode plate are joined and fixed by the first brazing, and then brazing of the temporarily assembled vacuum capacitor is conducted by the second brazing. That is, brazing between the terminal electrode and the electrode plate and brazing between the terminal electrode and the insulating pipe are separately conducted two times.

In contrast with this, in the capacitor manufacturing method according to the embodiment of the present invention, brazing between the terminal electrode 3 and the spiral electrode 5, brazing between the terminal electrode 4 and the spiral electrode 6, and brazing between the insulating pipe 2 and the terminal electrodes 3, 4 are conducted at the same time by a one-time brazing step. In the spiral electrode 5, the electrode 7 wound on the core member 9 is in the form of a single component. Therefore, it is not separated even if it is turned upside down. It is possible to fix the spiral electrode 5 to the terminal electrode 3, for example, by a method of pressing the projection section 3b of the terminal electrode 3 into the hole 9a of the core member 9. In this manner, it is possible to fix the spiral electrode 5 to the terminal electrode 3 in a manner to prevent the electrode plate 7 from falling down. Therefore, it becomes possible to conduct brazing between the terminal electrode 3 and the spiral electrode 5, at the same time when conducting brazing between the terminal electrode 4 and the electrode plate 10 and brazing between the insulating pipe 2 and the terminal electrodes 3, 4.

Figure 3:
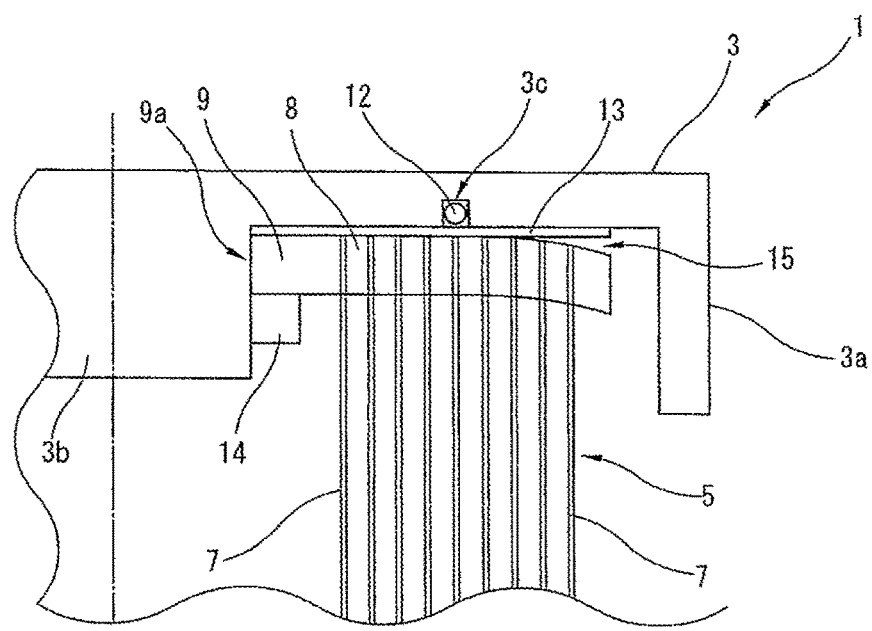
FIG. 3 is an explanatory view to explain a gap to be formed between the terminal electrode and the spiral electrode.

If the platy brazing material 13 is provided between the terminal electrode 3 and the spiral electrode 5, a gap corresponding to the thickness of the platy brazing material 13 is necessarily generated when conducting brazing. This gap cannot be filled with the platy brazing material 13 set there, and this makes a partial brazing between the terminal electrode 3 and the spiral electrode 5, thereby causing a risk that the brazing strength lowers. Furthermore, as shown in FIG. 3, in the case of fixing the spiral electrode 5 at a center section of the terminal electrode 3, there is a risk to generate a gap 15 by a warp of an outer peripheral section of the spiral electrode 5 due to its weight. This gap 15 cannot be filled with only the amount of the platy brazing material 13 set there, either.

Thus, in the capacitor manufacturing method according to the embodiment of the present invention, the groove 3c is formed in the terminal electrode 3, and the linear brazing material 12 is provided in this groove 3c, thereby supplementing the amount of the brazing material for joining the terminal electrode 3 and the spiral electrode 5 and making it possible to fill the gap (specifically, the gap corresponding to the platy brazing material 13 or the gap 15). As a result, it becomes possible to decrease the number of the brazing steps from two times or more hitherto conducted to one time. The capacitor manufacturing method according to the embodiment of the present invention makes it possible to conduct at the same time brazing between the terminal electrode 3 and the spiral electrode 5 and brazing of other parts (e.g., brazing between the terminal electrode 4 and the spiral electrode 6, and brazing between the insulating pipe 2 and the terminal electrode 3 or the terminal electrode 4). According to need, it is optional to conduct the brazing steps two times or more.

As above, the capacitor manufacturing method of the present invention has been explained in detail by showing a specific embodiment. The capacitor manufacturing method of the present invention is, however, not limited to the embodiment, but its suitable design modification is possible to the extent not to impair its characteristics. The design modified embodiment also belongs to the technological scope of the present invention.

For example, in the explanation of the embodiment, the capacitor manufacturing method according to the embodiment of the present invention has been explained by showing a vacuum capacitor as an example, but the capacitor manufacturing method of the present invention can be applied to not only a vacuum capacitor, but also a gas-filled capacitor, etc. Furthermore, it can be applied to a method for manufacturing either a fixed capacitance capacitor or a variable capacitance capacitor. In the case of making capacitance of the capacitor variable, it turns to providing bellows, etc. to make the distance between the terminal electrodes variable.

Furthermore, in the explanation of the embodiment, the platy brazing material 13 is provided between the terminal electrode 3 and the spiral electrode 5, but it is possible to omit the platy brazing material 13 if a sufficient amount of the brazing material is secured by the linear brazing material 12 provided in the groove 3c of the terminal electrode 3. However, in case that the platy brazing material 13 is provided, the platy brazing material 13 acts as a sort of trigger to make the linear brazing material 12 easily come out of the groove 3c. With this, it is possible to more securely fill the gap between the terminal electrode 3 and the spiral electrode 5.

Furthermore, there is no particular limitation in terms of the number, shape, position, size, etc. of the groove 3c formed in the terminal electrode 3 and of the linear brazing material 12 provided in the groove 3c. Their number, shape, position and size necessary for brazing the terminal electrode 3 and the spiral electrode 5 are suitably selected.

Figure 4:
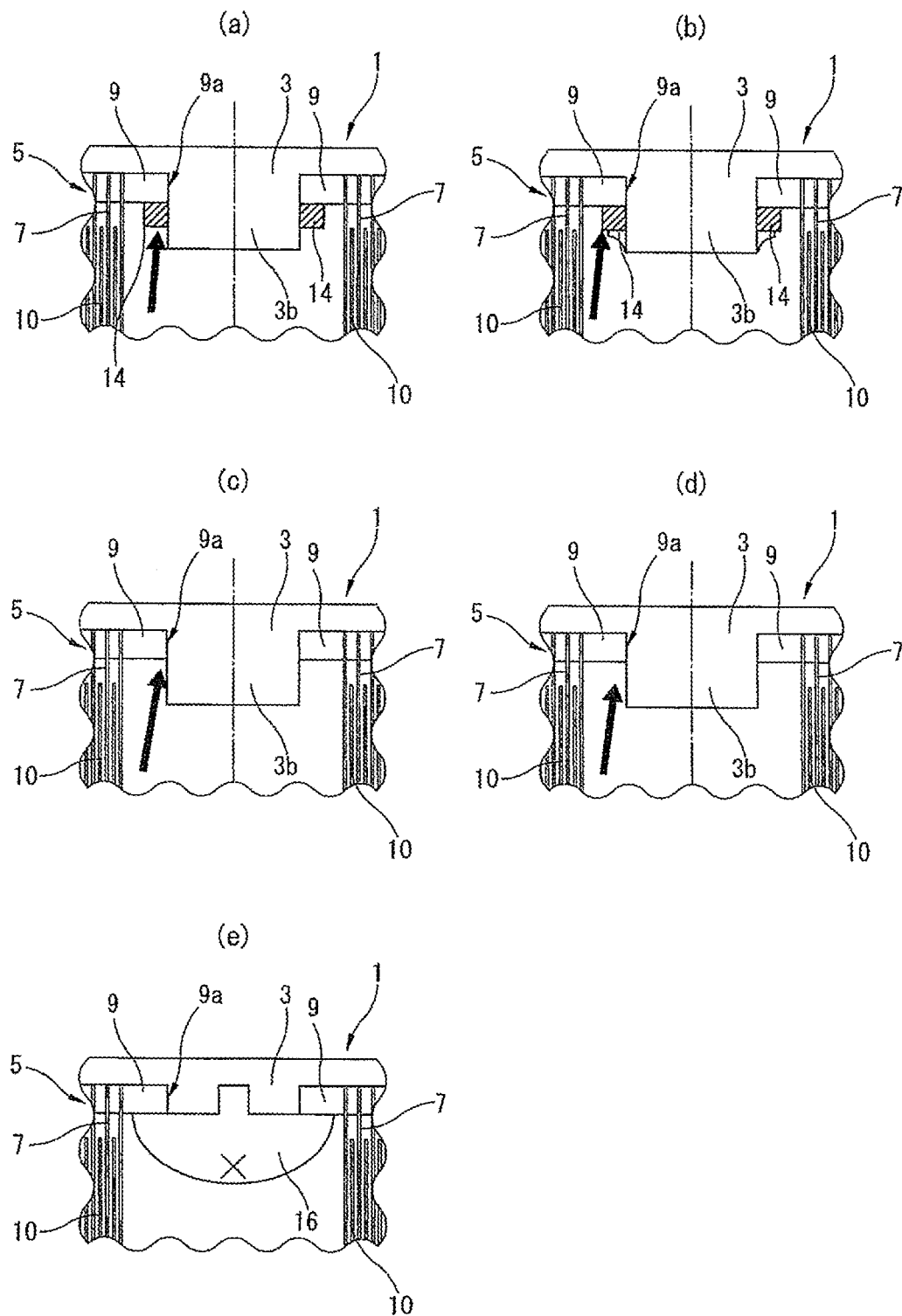

Furthermore, when temporarily assembling the vacuum capacitor 1, the method of fixing the spiral electrode 5 to the terminal electrode 3 is not limited to a method in which the projection section 3b of the terminal electrode 3 is inserted into the hole 9a of the core member 9 as shown in FIG. 4(a) and then the core member 9 is fixed by the ring member 14. As other methods for fixing the spiral electrode 5 to the terminal electrode 3, for example, there are provided a method (shown in FIG. 4(b)) in which the projection section 3b of the terminal electrode 3 is inserted into the hole 9a of the core member 9, then the core member 9 is fixed by the ring member 14, and a tip end section of the projection section 3b is caulked to fix the spiral electrode 5, a method (shown in FIG. 4(c)) in which the projection section 3b of the terminal electrode 3 is pressed into the hole 9a of the core member 9 to fix the spiral electrode 5, a method (shown in FIG. 4(d)) in which the projection section 3b of the terminal electrode 3 is pressed into the hole 9a of the core member 9, and then a jig is pressed thereagainst to deform the core member 9, thereby fixing the spiral electrode 5, a method (shown in FIG. 4(e)) in which the projection section 3b of the terminal electrode 3 is inserted into the hole 9a of the core member 9, and then the terminal electrode 3 and the core member 9 are fixed together by a screw (or rivet), etc.

Furthermore, the present invention is an invention according to a capacitor manufacturing method, but a capacitor manufactured by this manufacturing method belongs to the technological scope of the present invention.

The invention claimed is:

1. A method for manufacturing a capacitor provided with an insulating pipe, first and second terminal electrodes that are disposed at open ends of the insulating pipe, a first electrode plate that stands on the first terminal electrode and extends from the first terminal electrode toward an inside of the insulating pipe, a second electrode plate that stands on the second terminal electrode and extends from the second terminal electrode toward the inside of the insulating pipe, a first core member on which the first electrode plate is wound, and a second core member on which the second electrode plate is wound, the capacitor having a groove formed in a surface of the first terminal electrode on a side of the inside of the insulating pipe, the method comprising the steps of:

winding a stack of the first electrode plate and a spacer on the first core member, thereby obtaining a first spiral electrode;

winding a stack of the second electrode plate and a spacer on the second core member, thereby obtaining a second spiral electrode;

providing a brazing material in the groove of the first terminal electrode and temporarily attaching the first spiral electrode to the first terminal electrode;

placing the insulating pipe and the second spiral electrode on the second terminal electrode and disposing the first terminal electrode, to which the first spiral electrode has been temporarily attached, at an upper open end of the insulating pipe, thereby assembling the capacitor; and brazing the first terminal electrode and the first spiral electrode, brazing the second terminal electrode and the second spiral electrode, brazing the first terminal electrode and the insulating pipe, and brazing the second terminal electrode and the insulating pipe.

2. The method for manufacturing a capacitor as claimed in claim 1, wherein, in the step of temporarily attaching the first spiral electrode to the first terminal electrode, a brazing material is provided between the first terminal electrode and the first spiral electrode.

* * * * *